Figure 1:
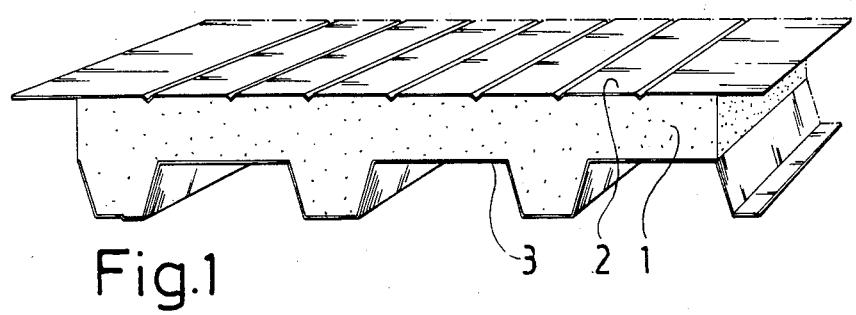

United States Patent [19]

Luomanen

[11] Patent Number: 4,499,645
[45] Date of Patent: Feb. 19, 1985

[54] PROCEDURE FOR MANUFACTURING A ROOF ELEMENT

[75] Inventor: Asko Luomanen, Karvia, Finland

[73] Assignee: Kone OY, Helsinki, Finland

[21] Appl. No.: 495,110

[22] Filed: May 16, 1983

[51] Int. Cl.$^3$ ............................................. B23P 9/00
[52] U.S. Cl. ...................................... 29/445; 29/460; 29/469.5; 29/514; 52/309.9; 52/528; 264/261
[58] Field of Search ................. 29/445, 509, 521, 514, 29/515, 469.5, 460, 155 R; 52/309.9, 581, 829, 528, 537, 538; 264/261

[56] References Cited

U.S. PATENT DOCUMENTS

| | | | |
|---|---|---|---|
| 3,159,943 | 12/1964 | Sugar et al. | 52/309.9 X |
| 3,228,162 | 1/1966 | Gregoire | 52/309.9 |
| 3,457,629 | 7/1969 | Janecek | 29/514 X |
| 3,460,304 | 8/1969 | Braeuninger et al. | 29/515 UX |
| 3,932,976 | 1/1976 | Steel | 52/309.9 |
| 4,193,239 | 3/1980 | Barto | 52/528 X |
| 4,196,554 | 4/1980 | Anderson et al. | 52/528 X |
| 4,416,047 | 11/1983 | Riexinger et al. | 29/460 |

FOREIGN PATENT DOCUMENTS 1814338 7/1969 Fed. Rep. of Germany ........ 29/514

Primary Examiner—Charlie T. Moon
Attorney, Agent, or Firm—Martin Smolowitz

[57] ABSTRACT

Procedure for manufacturing a roof element wherein in the space between two sheets, that is, between a top and a bottom sheet (2,3), lagging material (1) such as polyurethane is foamed. It is only after foaming the lagging (1) that the folds (4,5) required for joining by machine are profiled by roller forming technique on the margins of the top sheet (2). The invention makes for faster and simpler manufacturing of the roof element. In comparison with procedures now in use, the cutting of the top sheet (2) from stock is simplified, the points of escape will be less, implying better quality, the manufacturing takes less time and continuous moulding, which presents the most efficient manufacturing method at the time, becomes applicable in this process in competitive and technologically sound production of these roof elements.

1 Claim, 4 Drawing Figures

PROCEDURE FOR MANUFACTURING A ROOF ELEMENT

The present invention concerns a procedure for manufacturing a roof element, wherein between two metal sheets is foamed, or between them is fixed by glueing, a thermal lagging such as polyurethane.

Manufacturing procedures like this known in the art present the drawback that shearing the pre-profiled top metal sheet by the so-called guillotine principle is difficult. The shearing has to be accomplished in two steps. When a lagging processed by foaming such as polyurethane is used, points of escape difficult to control are formed on the long sides of the element. The lagging material flows into the crevices of the folds for joining by machine and is difficult to remove. The folds to be joined by machine add about 30 mm to the thickness of the element, thus wasting effective pressing space in the mould at different manufacturing steps. When the roof element is manufactured on a so-called continuous moulding line, the top and bottom sheet have to be inserted in the machine formed to present their final profiled shape. The consequence is greater space required for the apparatus longitudinally, and it implies difficult technical solutions.

The object of the present invention is to eliminate the drawbacks presented above. The procedure of the invention is characterized in that subsequent to fixing the lagging, the folds required for joining by machine are profiled on the edges of the top sheet by a roller forming technique. The invention enables the top sheet to be cut with conventional sheet metal cutters while it is smooth. It becomes possible to place the smooth top sheet in the mould with the best conceivable sealing, thereby avoiding detrimental flowout. The space occupied by the machine-joining folds is now efficiently usable. Five instead of four elements can be manufactured in the same press interval. In the case of a continuous moulding line, the top sheet is introduced from a reel into the moulding line, whereby the manufacturing no longer differs essentially from the manufacturing of a simple thermal lagging element.

The invention is describerd in the following by the aid of an example, referring to the drawing attached, wherein FIGS. 1 to 4 present the profiling of the margins of the top sheet of a roof element, in its different steps, when manufacturing a roof element provided with polyurethane lagging.

Figure 2:
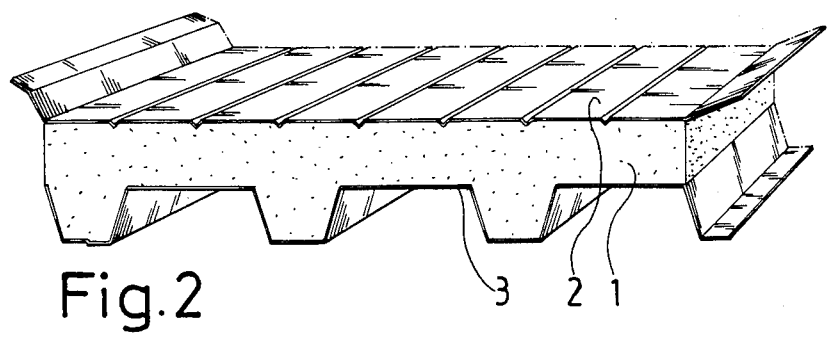
Figure 3:
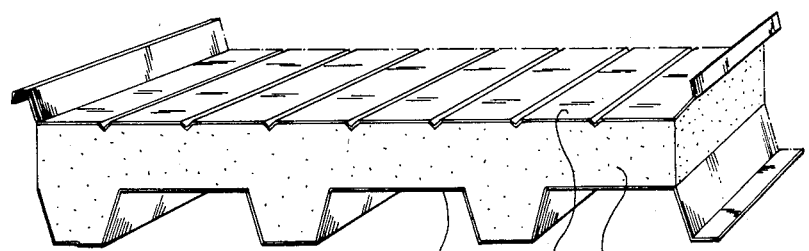
Figure 4:
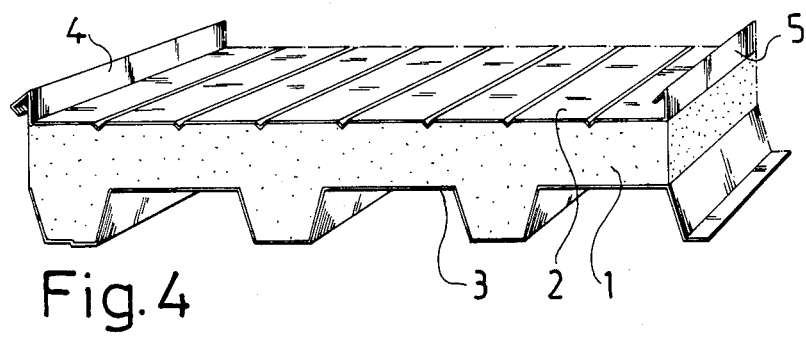

In the roof element manufacturung procedure, polyurethane 1 is introduced and foamed in the space between the top and bottom sheets 2,3. It is not until after the foaming of the polyurethane 1 that joining folds 4,5 required for joining by machine are profiled by a roller moulding technique on the margins of the top sheet 2. The element of FIG. 1 is placed on a roller track, fitted on opposite sides with profiling stations. FIGS. 2 and 3 illustrate the progress of the margin profiling, that is, the generation of the folds for machine joining. The completed product is presented in FIG. 4.

I claim:

1. A manufacturing procedure for a roof element, comprising foaming or affixing by gluing a thermal lagging such as polyurethane in the space between two spaced upper and lower metal sheets located between moulds, said top sheet having co-planar longitudinal edges that extend outwardly beyond said lagging that are to be formed into a folded profile for machine joining to an adjacent roof element, and, wherein subsequent to foaming or affixing the lagging material, deforming by roller forming techniques said free longitudinal edges of the top sheet to profile the joining folds required for joining to adjacent roof elements by machine.

* * * * *